US008949662B2

(12) United States Patent
Desai et al.

(10) Patent No.: US 8,949,662 B2
(45) Date of Patent: Feb. 3, 2015

(54) LOGICAL PARTITIONING OF A PHYSICAL DEVICE

(75) Inventors: Ronak Desai, Fremont, CA (US); Ramana Mellacheruvu, San Jose, CA (US); Dino Farinacci, San Jose, CA (US); Amitkumar Patel, Fremont, CA (US); Umesh Mahajan, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 112 days.

(21) Appl. No.: 13/543,671

(22) Filed: Jul. 6, 2012

(65) Prior Publication Data
US 2012/0278458 A1    Nov. 1, 2012

Related U.S. Application Data

(62) Division of application No. 11/697,612, filed on Apr. 6, 2007, now Pat. No. 8,225,134.

(51) Int. Cl.
*G06F 11/00* (2006.01)
*H04L 12/24* (2006.01)
*G06F 11/14* (2006.01)
*H04L 29/14* (2006.01)
*H04L 29/08* (2006.01)

(52) U.S. Cl.
CPC ........ *H04L 41/0654* (2013.01); *G06F 11/1482* (2013.01); *H04L 69/40* (2013.01); *H04L 69/32* (2013.01)
USPC .......................................................... 714/6.3

(58) Field of Classification Search
CPC ..................................................... G06G 11/00
USPC ............................................................ 714/6.3
See application file for complete search history.

(56) References Cited

U.S. PATENT DOCUMENTS

| 7,185,223 B2 | 2/2007 | Hsu et al. |
| 7,342,874 B2 | 3/2008 | Pegrum et al. |
| 7,424,710 B1 * | 9/2008 | Nelson et al. ..................... 718/1 |
| 7,577,959 B2 | 8/2009 | Nguyen et al. |
| 8,018,841 B2 | 9/2011 | Holness et al. |
| 8,024,732 B2 * | 9/2011 | Sheehan et al. ............... 718/100 |
| 8,028,071 B1 * | 9/2011 | Mahalingam et al. ........ 709/227 |
| 8,320,389 B2 * | 11/2012 | Zhang et al. .................. 370/401 |

(Continued)

OTHER PUBLICATIONS 802.1D IEEE Standard for Local and metropolitan area networks, Media Access Control (MAC) Bridges, IEEE Computer Society, 2004.

(Continued)

*Primary Examiner* — Amine Riad

(57) ABSTRACT

In one embodiment, an indication of a fault condition is received relating to a first service running on a physical device in a computer network. The first service is associated with a first virtual device context defined on the physical device. Then, the first service is disabled without affecting operation of a second service on the physical device. The second service is associated with a second virtual device context defined on the physical device. In another embodiment, a first virtual device context is created on a physical device in a computer network. Then, a second virtual device context is created on the physical device. The first virtual device context may then be managed independently of the second virtual device context such that resources assigned to a virtual device context are managed without affecting management of another virtual device context.

20 Claims, 6 Drawing Sheets

(56) References Cited

U.S. PATENT DOCUMENTS

| | | |
|---|---|---|
| 2002/0013802 A1 | 1/2002 | Mori et al. |
| 2003/0051048 A1 | 3/2003 | Watson et al. |
| 2003/0120713 A1 | 6/2003 | Fenchel |
| 2003/0198182 A1 | 10/2003 | Pegrum et al. |
| 2005/0108593 A1 | 5/2005 | Purushothaman et al. |
| 2005/0125557 A1 | 6/2005 | Vasudevan et al. |
| 2006/0195556 A1 | 8/2006 | Shamia et al. |
| 2008/0189700 A1 | 8/2008 | Schmidt et al. |
| 2008/0215910 A1 | 9/2008 | Gabriel et al. |
| 2008/0250260 A1* | 10/2008 | Tomita .......... 713/324 |
| 2008/0263410 A1 | 10/2008 | Mittal et al. |
| 2009/0094610 A1* | 4/2009 | Sukirya .......... 718/105 |
| 2009/0241108 A1 | 9/2009 | Edwards et al. |
| 2009/0249115 A1 | 10/2009 | Bycroft et al. |
| 2009/0290591 A1* | 11/2009 | Zhang et al. .......... 370/401 |
| 2011/0075662 A1 | 3/2011 | Rathunde et al. |
| 2012/0224584 A1* | 9/2012 | Zhang et al. .......... 370/395.53 |
| 2014/0140221 A1* | 5/2014 | Manam et al. .......... 370/250 |
| 2014/0189125 A1* | 7/2014 | Amies et al. .......... 709/226 |
| 2014/0215467 A1* | 7/2014 | Niesser et al. .......... 718/1 |

OTHER PUBLICATIONS

International Search Report and the Written Opinion of the International Searching Authority, or the Declaration for PCT Application No. PCT/US08/59436 mailed Jun. 27, 2008.

U.S. Non-Final Office Action dated Dec. 15, 2009 from U.S. Appl. No. 11/697,612.

U.S. Final Office Action dated Jun. 25, 2010 from U.S. Appl. No. 11/697,612.

U.S. Non-Final Office Action dated Nov. 29, 2010 from U.S. Appl. No. 11/697,612.

U.S. Final Office Action dated May 26, 2011 from U.S. Appl. No. 11/697,612.

U.S. Non-Final Office Action dated Oct. 14, 2011 from U.S. Appl. No. 11/697,612.

U.S. Notice of Allowance dated Mar. 13, 2012 from U.S. Appl. No. 11/697,612.

* cited by examiner

LOGICAL PARTITIONING OF A PHYSICAL DEVICE

RELATED APPLICATIONS

This application is a divisional application and claims priority from U.S. patent application Ser. No. 11/697,612, entitled "LOGICAL PARTITIONING OF A PHYSICAL DEVICE," by Ronak Desai et al, filed on Apr. 6, 2007, which is incorporated herein by reference for all purposes.

BACKGROUND

1. Technical Field

The present disclosure relates to computer networking.

2. Description of the Related Art

Next generation network devices may be designed with multiple technologies embedded into a single device. For example, a device may designed with storage, Ethernet switching, and Ethernet routing. There may also be multiple protocols supported within each device technology. For example, multiple Ethernet protocols may be supported by the single device. Even though all of these technologies are hosted in one device, they participate in completely independent networks.

DESCRIPTION OF EXAMPLE EMBODIMENTS

Overview

Figure 1:
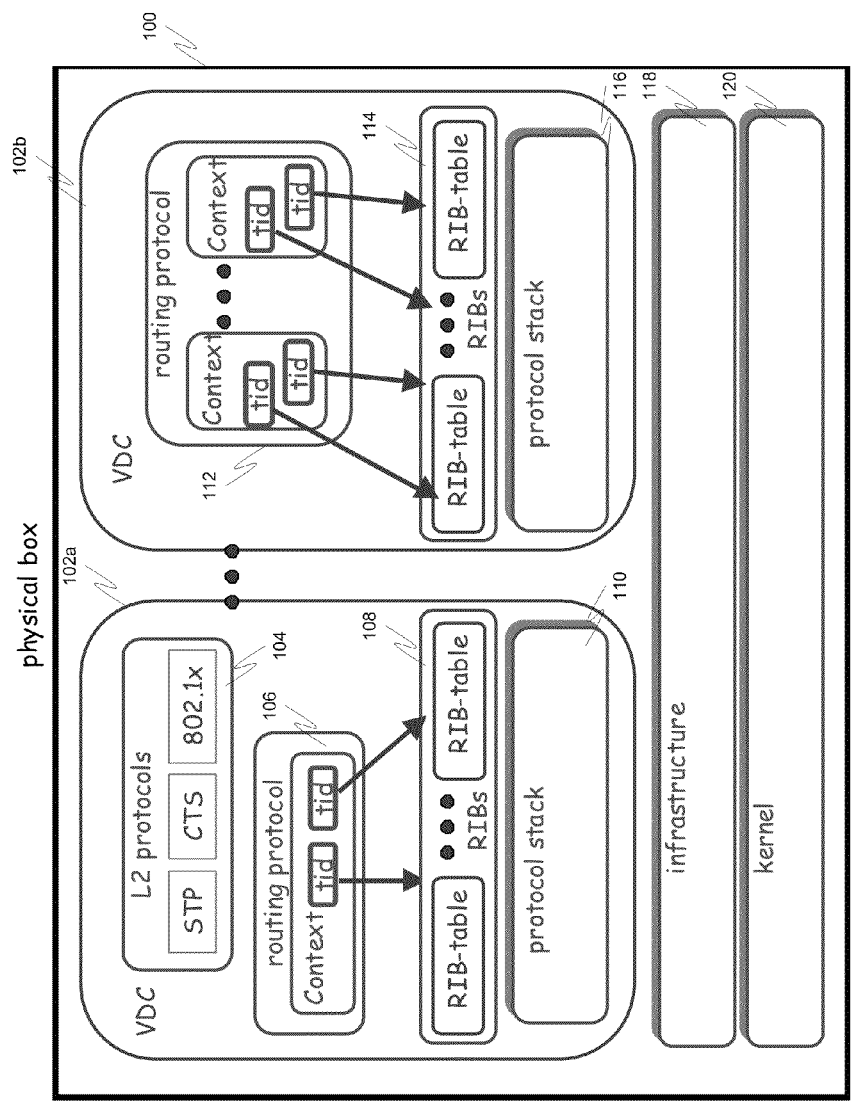
FIG. 1 is a diagram illustrating an example of a virtualization architecture.

In one embodiment, an indication of a fault condition is received relating to a first service running on a physical device in a computer network. The first service is associated with a first virtual device context defined on the physical device. Then, the first service is disabled without affecting operation of a second service on the physical device. The second service is associated with a second virtual device context defined on the physical device.

In another embodiment, a first virtual device context is created on a physical device in a computer network. Then, a second virtual device context is created on the physical device. The first virtual device context may then be managed independently of the second virtual device context such that resources assigned to a virtual device context are managed without affecting management of another virtual device context.

Example Embodiments

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order to not obscure the present invention.

As devices such as data center devices, which incorporate numerous different technologies into individual devices, progress towards a more service oriented network environment, it may be beneficial to utilize network devices as a resource that can be partitioned based on service requirements. Even though different services co-exist on a physical device, each service can often have different requirements for fault isolation, management isolation, as well as resource isolation and allocation.

In hosted environments when multiple administrators are managing a single physical device, co-ordination must occur between all of the administrators before changing any configuration. A misconfiguration by one administrator could bring down the entire device, affecting resources outside of the control and/or purview of the administrator.

Furthermore, network switches and routers are traditionally designed to provide high availability by having redundant hardware components and running software services in a hot standby mode. This redundancy model attempts to immediately switch to standby hardware/software in case of a fault. A kernel crash, file system corruption, or other software crash in one of the software components causes all of the services on the physical device to be passed to the standby hardware/software. In the case where no standby is available, however, the entire physical switch is reset, which interrupts the processing of all of the services on the physical switch.

A redundant supervisor model may allow a physical switch to remain operational in the event of a failure in one of its services. In this model, multiple supervisor processes run on a single physical device. One of the supervisors is active, and controls the various services available on the device. If a failure should occur, the supervisor may go down, and then the standby supervisor is activated. This allows services to remain active even though they reside on the same physical switch as a service that has gone down. However, in the case where the failure occurs do to an external issue, such as a fault caused by an external device or based on corrupted network topology, the standby supervisor will suffer the same failure as the original supervisor.

Therefore, virtualization may be provided to allow for the logical partitioning of a physical device into multiple partitions. This can be used in lieu of a redundant supervisor model and provides protection even in the case of a failure caused by an external issue. The logical partitioning also addresses another issue. Some of the services available on the device are applied to all the interfaces (unless particular interfaces are specified). One such example is Spanning Tree Protocol (STP) where STP either can be running on a per VLAN Rapid Spanning Tree (PVRST) or on Multiple Spanning Tree (MST) mode for the entire switch. If the network topology is such that one partition (part?) of the network can run PVRST because of a small number of VLANs and another part of the network needs to run MST due to scalability, it becomes possible to do so in a single device by utilizing logical partitioning.

A virtual device context (VDC) is a way to partition a single physical device into multiple logical devices to provide fault isolation, management isolation, address allocation isolation, service differentiation domains, adaptive resource management, and other service isolation. VDCs allow each instance within a physical device to be managed independently from each other. Each VDC may be carved out with certain resources allocated to it by a supervisor-user. Once the resources are assigned, in some implementations they may be managed by administrators of that VDC only.

FIG. 1 is a diagram illustrating an example of a virtualization architecture. A single physical box 100 may contain multiple VDCs 102a, 102b. In this example, VDC 102a contains several layer 2 protocols 104 and a routing protocol 106. The routing protocol may be used along with Routing Information Bases (RIBs, also called routing tables) 108 and a protocol stack 110. VDC 102b contains a routing protocol 112 that may or may not be the same as the routing protocol 106 for VDC 102a, along with RIB tables 114 and a protocol stack 116. Both VDC's may share certain software on the physical box, including infrastructure 118 and kernal 120.

A fault in one of the services of VDC 102a would not affect the operation of VDC 102b (and vice-versa). Likewise, an administrator could upgrade VDC 102a without affecting the operation of VDC 102b (and vice-versa).

For purposes of this document, when a VDC is said to be "defined on" or "created on" a physical device, this shall be interpreted to mean that the VDC is set up to operate on the physical device as a logical component of the device. While in many embodiments this may involve the storage of VDC configuration information in memory on the physical device, embodiments are also possible wherein the configuration or other "definition" information for the VDC are stored elsewhere than the physical device. The terms "defined on" and "created on" shall be interpreted to encompass all of these different embodiments.

Figure 2:
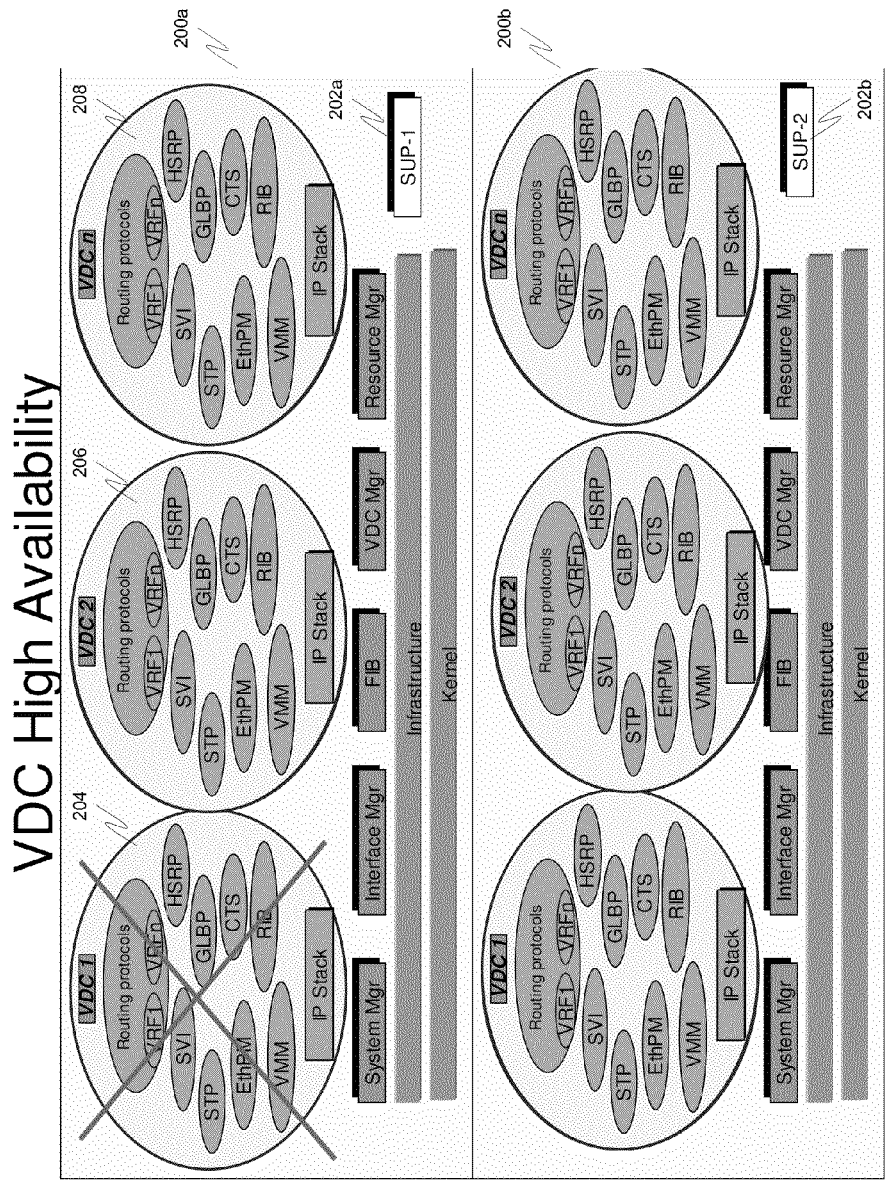
FIG. 2 is a diagram illustrating an example of using Virtual Device Contexts (VDCs) for high availability.

FIG. 2 is a diagram illustrating an example of using VDCs for high availability. Here, two physical devices 200a, 200b are utilized for redundant supervisor control. Each physical device 200a, 200b has a supervisor service 202a, 202b. The supervisor services 202a, 202b may both be active at the same time. The VDCs within each physical device 200a, 200b allow, for example, supervisor service 202a to remain active even though a service in VDC1 204 has gone down. It is even possible to fail over the failed VDC1 204 to a different physical device while VDC2 206 and VDCn 208 remain on physical device 200a and supervisor 202a remains active.

Figure 3:
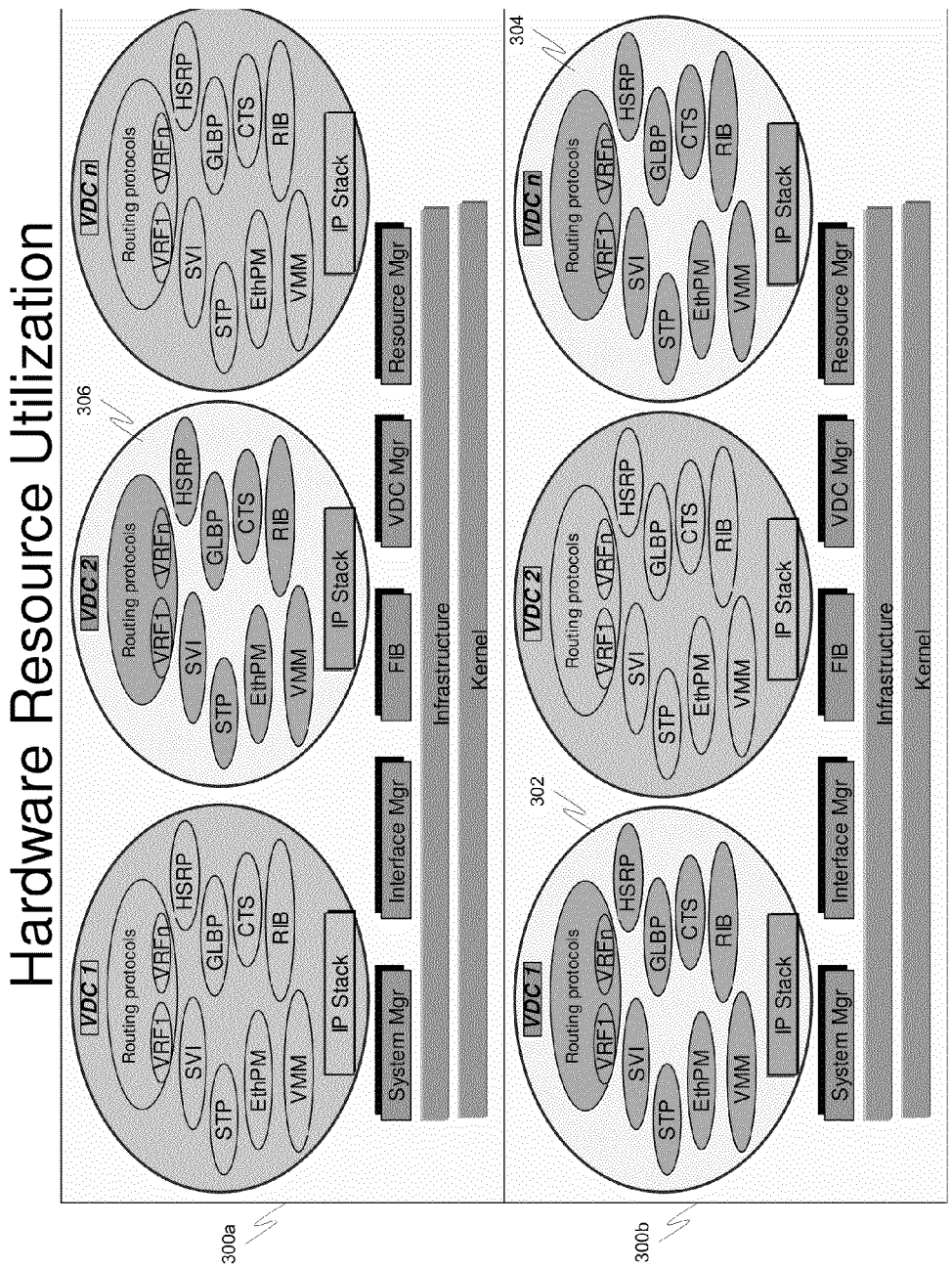
FIG. 3 is a diagram illustrating an example of using VDCs for improved hardware resource utilization.

FIG. 3 is a diagram illustrating an example of using VDCs for improved hardware resource utilization. Here, VDCs set up on multiple physical devices 300a, 300b can be selectively utilized to best allocate available hardware resources. For example, VDC1 302 and VDCn 304 may be operated on physical device 300b while VDC2 306 may be operated on physical device 300a. Should circumstances change, it may then be more efficient to switch operation over VDC1 302 to physical device 300a, which can be done without causing any effect on VDCn 304 or any other VDCs running on physical device 300b.

Figure 4:
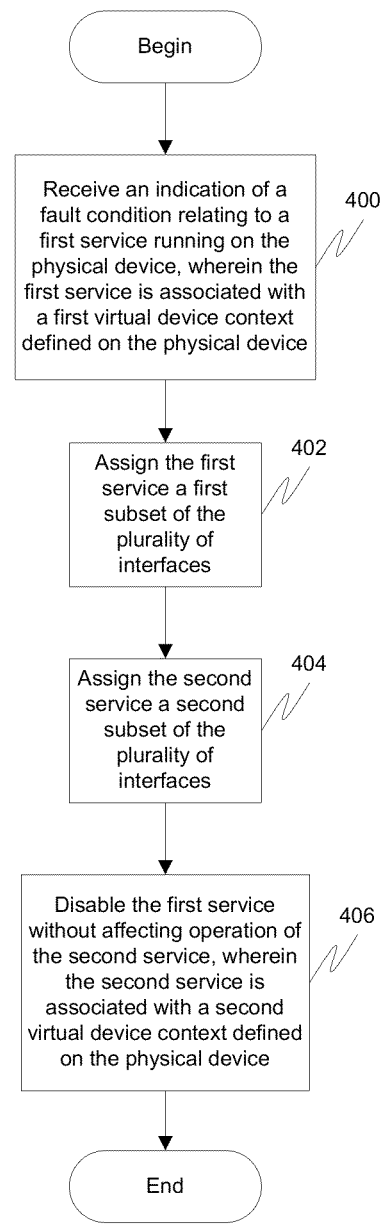
FIG. 4 is a flow diagram illustrating an example of a method for operating a physical device in a computer network.

FIG. 4 is a flow diagram illustrating an example of a method for operating a physical device in a computer network. The physical device may be any type of network device, but in one embodiment the physical device is a router or switch. At 400, an indication of a fault condition relating to a first service running on the physical device is received. The first service is associated with a first virtual device context defined on the physical device. The first virtual device context and the second virtual device context may each be associated with one or more different types of services, including, for example, layer 2 services, layer 3 services, and storage area network services. In one embodiment, each of the first virtual device context and second virtual device context are associated with at least one layer 2 service. These layer 2 services may be utilizing the same or different protocols. In another embodiment, the first virtual device context represents a first supervisor process and the second virtual device context represents a second supervisor process, wherein both the first supervisor process and the second supervisor process are active at the same time. In yet another embodiment, one of the virtual device contexts acts as an active supervisor and another of the virtual device contexts acts as a backup supervisor. The physical device may have a plurality of interfaces and these interfaces may be assigned to various virtual device context. In this embodiment, at 402, the first service is assigned a first subset of the plurality of interfaces and at 404, the second service is assigned a second subset of the plurality of interfaces, wherein the first subset and the second subset have no overlapping interfaces. At 406, the first service running on the physical device is disabled without affecting operation of a second service on the physical device. The second service is associated with a second virtual device context defined on the physical device. It should be noted that the phrase "without affecting operation of" throughout this document should be interpreted to mean "without causing a failure or significant reduction in efficiency of."

Figure 5:
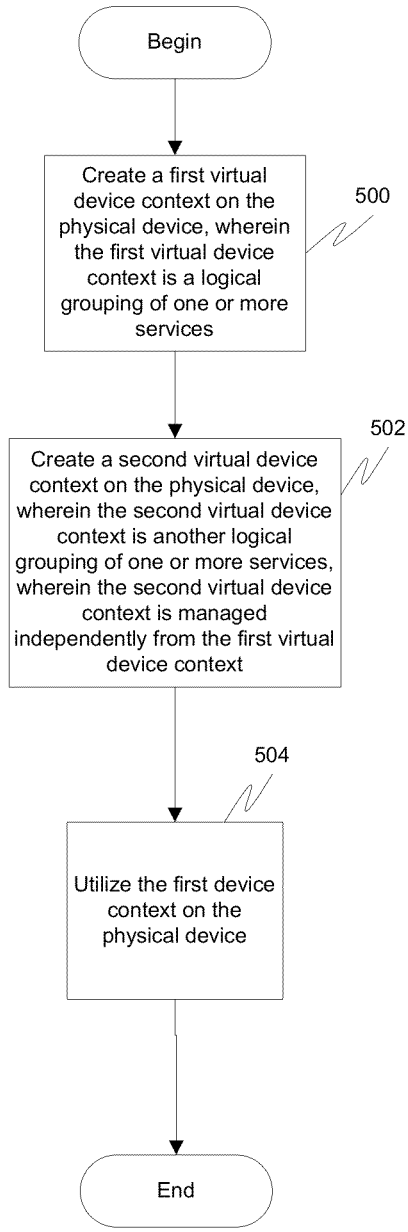
FIG. 5 is a flow diagram illustrating another example of a method for operating a physical device in a computer network.

FIG. 5 is a flow diagram illustrating another example of a method for operating a physical device in a computer network. The physical device may be any type of network device, but in one embodiment the physical device is a router or switch. At 500, a first virtual device context is created on the physical device. The first virtual device context is a logical grouping of one or more services. At 502, a second virtual device context is created on the physical device. The second virtual device context is another logical grouping of one or more services. The first virtual device context is capable of being managed independently of the second virtual device context such that resources assigned to a virtual device context are capable of being managed without affecting management of another virtual device context. It should be noted that the phrase "without affecting management of" throughout this document should be interpreted to mean "without causing a significant effect on control or operation of."

At 504, the first virtual device context may be utilized on the physical device. Several alternative embodiments are possible is this step. In one embodiment, an Active-Active high availability redundancy model may be configured using the first virtual device context and the second virtual device context by defining both the first virtual device context and the second virtual device contexts as active redundant supervisors. In another embodiment, the first virtual device context is configured to act as an active supervisor while the second virtual device context may be configured to act as a backup supervisor. In another embodiment, the second virtual device context may be assigned to another physical device without affecting operation of the first virtual device context. In another embodiment, the physical device may be operated according to the process described in FIG. 4 and the accompanying text above. In another embodiment, the first virtual device context may be upgraded without affecting operation of the second virtual device context.

Figure 6:
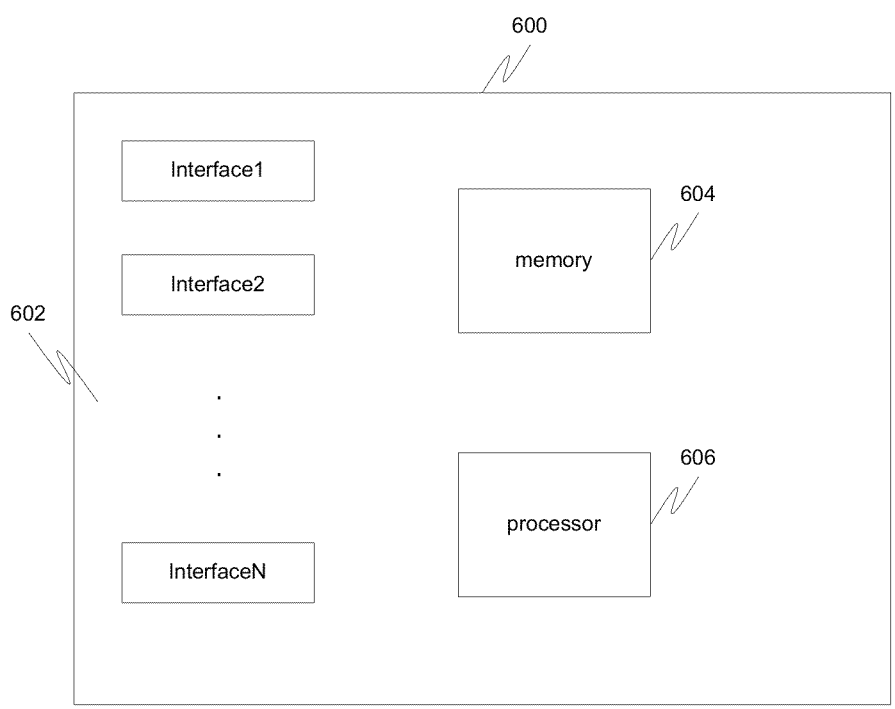
FIG. 6 is a simplified block diagram illustrating an example of a router or switch on which one or more of the processes described above may be run.

FIG. 6 is a simplified block diagram illustrating an example of a router or switch on which one or more of the processes described above may be run. The router or switch 600 may have one or more interfaces 602 and a memory 604. The router or switch 600 may then also have a processor 604 that may be configured to perform the above-described processes and store virtual device context information in the memory 604. Other information relating to the processes described above may also be stored in the memory 604 by the processor 606.

Embodiments are also envisioned wherein the router or switch comprises one or more line cards, wherein each line card may contain the architecture of the switch or router in FIG. 6. Further embodiments are possible wherein the switch, router, or line cards may each contain multiple processors that distribute the load.

VDCs allow software fault isolation across different logical instances. A fault in one logical instance does not affect any other logical instance. Therefore, the effects of a fault are contained within a single logical instance. This fault could be any kind of software service crash, kernal crash, misconfiguration, security attack, or contamination of resource such as file system corruption. VDCs can greatly improve the stability of the physical device.

Since each VDC may run a different instance of an image, it is also possible to upgrade or patch an individual service or an entire image for the VDC without taking other services offline. This also allows administrators to fix certain software bugs, for example, topology-related bugs, as each VDC could be a part of a different network topology. Since two VDCs are independent of one another, each VDC can run a different software version, thus providing flexibility for customers to test new versions of software on the same hardware device without affecting their production network.

The independent nature of each VDC also allows a new high availability redundancy model of Active-Active for control processes. Usually a high availability model uses one hot standby supervisor to run software services in standby mode. The standby supervisor takes over the function of the active supervisor in case of software failure based on predefined policies. By using VDCs, both the supervisor and the backup can actually be in active mode at the same time and the user can even selectively fail over a VDC to different hardware if desired. This allows a much more flexible high availability model. It also allows users to utilize all the hardware resources on a device. Even in the case of a single supervisor it is possible to have an active-standby model where a VDC could be acting as a standby of the same supervisor.

Furthermore, a supervisor-user of the physical device can assign resources to a VDC. Resources could be any physical resource such as interfaces, cpu, memory, TCAM space, L2 VLANs, routing information learnt, etc. Once resources are assigned to VDC, it may be managed only through the VDC context.

Additionally, each VDC may have its own configuration and authentication domain which could be independent and different from the physical device. All the management and system messages may also be localized to the VDC. This provides isolation in hosted environments where a user may want to hide configuration from other users who are co-hosted on the same physical device. This allows for greater flexibility in hosted environments where multiple administrators are co-hosted on one physical device.

VDCs also provide service differentiation across logical instances. VDCs allow a user to run service instances on a per-VDC basis and thus enables the user to run different services in each logical instance independent of each other. This also improves reliability of the network across logical instances where, for example, a loop caused by STP in one logical instance would not bring down the entire network.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are to be considered as illustrative and not restrictive, and the invention is not to be limited to the details given herein, but may be modified within the scope and equivalents of the appended claims.

We claim:

1. A method comprising:
   creating a first virtual device context on a physical device in a computer network, wherein the first virtual device context is a first logical grouping of one or more services; and
   creating a second virtual device context on the physical device, wherein the second virtual device context is a second logical grouping of one or more services,
   wherein the first virtual device context is capable of being managed independently of the second virtual device context such that resources assigned to either virtual device context are capable of being managed without affecting management of the other virtual device context.

2. The method of claim 1, further comprising upgrading a first service without interrupting processing of a second service.

3. The method of claim 1, further comprising:
   defining both the first virtual device context and the second virtual device context as active redundant supervisors.

4. The method of claim 1, further comprising:
   configuring the first virtual device context to act as an active supervisor; and
   configuring the second virtual device context to act as a backup supervisor.

5. The method of claim 1, wherein the first virtual device context is associated with one or more services from the group consisting of: layer 2 services, layer 3 services, and storage area network services and the second virtual device context is associated with one or more services from the group consisting of: layer 2 services, layer 3 services, and storage area network services.

6. The method of claim 1, wherein the first virtual device context and the second virtual device context are each associated with a shared layer 2 service.

7. The method of claim 1, further comprising:
   receiving an indication of a fault condition relating to a first service running on the physical device, wherein the first service is associated with the first virtual device context; and
   disabling the first service without affecting operation of a second service on the physical device, wherein the second service is associated with the second virtual device context.

8. A network device comprising:
   one or more interfaces;
   a memory; and
   a processor, at least one of the processor or the memory being configured for:
   creating a first virtual device context in the memory, wherein the first virtual device context is a first logical grouping of one or more services; and
   creating a second virtual device context in the memory, wherein the second virtual device context is a second logical grouping of one or more services;
   wherein the first virtual device context is capable of being managed independently of the second virtual device context such that resources assigned to a virtual device context is capable of being managed without affecting management of another virtual device context.

9. The network device of claim 8, wherein both the first virtual device context and the second virtual device context are defined as active redundant supervisors.

10. The network device of claim 8, wherein the first virtual device context is configured to act as an active supervisor and the second virtual device context is configured to act as a backup supervisor.

11. The network device of claim 8, wherein the first virtual device context is associated with one or more services from the group consisting of: layer 2 services, layer 3 services, and storage area network services and the second virtual device context is associated with one or more services from the group consisting of: layer 2 services, layer 3 services, and storage area network services.

12. The network device of claim 8, wherein the first virtual device context and the second virtual device context are each associated with a shared layer 2 service.

13. The network device of claim 8, at least one of the processor or the memory being further configured for performing steps, further comprising:
receiving an indication of a fault condition relating to a first service running on the network device, wherein the first service is associated with the first virtual device context; and
disabling the first service without affecting operation of a second service on the network device, wherein the second service is associated with the second virtual device context.

14. An apparatus comprising:
means for creating a first virtual device context on a physical device in a computer network, wherein the first virtual device context is a first logical grouping of one or more services; and
means for creating a second virtual device context on the physical device, wherein the second virtual device context is a second logical grouping of one or more services;
wherein the first virtual device context is capable of being managed independently of the second virtual device context such that resources assigned to a virtual device context is capable of being managed without affecting management of another virtual device context.

15. The apparatus of claim 14, further comprising:
means for receiving an indication of a fault condition relating to a first service running on the physical device, wherein the first service is associated with the first virtual device context; and
means for disabling the first service without affecting operation of a second service on the physical device, wherein the second service is associated with the second virtual device context.

16. The apparatus of claim 14, wherein both the first virtual device context and the second virtual device context are defined as active redundant supervisors.

17. The apparatus of claim 14, wherein the first virtual device context is configured to act as an active supervisor and the second virtual device context is configured to act as a backup supervisor.

18. The apparatus of claim 14, further comprising:
means for configuring the first virtual device context to act as an active supervisor; and
means for configuring the second virtual device context to act as a backup supervisor.

19. The apparatus of claim 14, wherein the first virtual device context is associated with one or more services from the group consisting of: layer 2 services, layer 3 services, and storage area network services and the second virtual device context is associated with one or more services from the group consisting of: layer 2 services, layer 3 services, and storage area network services.

20. The apparatus of claim 14, wherein the first virtual device context and the second virtual device context are each associated with a shared layer 2 service.

\* \* \* \* \*